Figure 1:
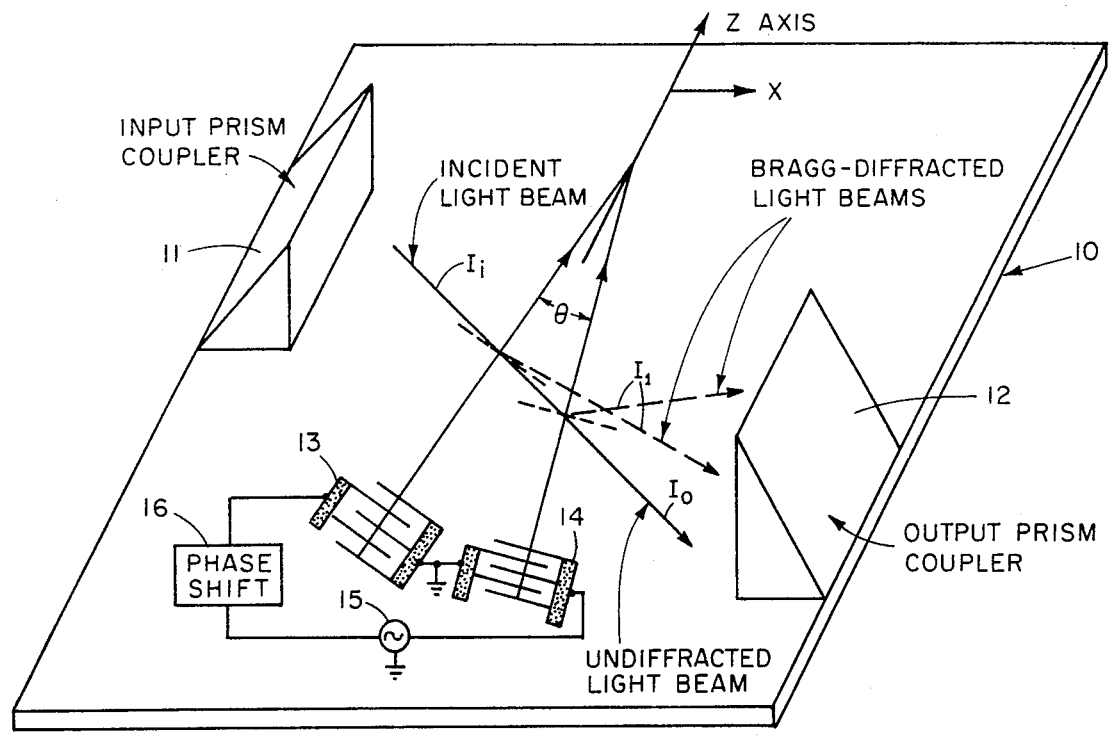

United States Patent
Tsai

4,027,946
June 7, 1977

[54] ACOUSTO-OPTIC GUIDED-LIGHT BEAM DEVICE

[75] Inventor: Chen S. Tsai, Pittsburgh, Pa.

[73] Assignee: The United States of America as represented by the Secretary of the Navy, Washington, D.C.

[22] Filed: Sept. 24, 1975

[21] Appl. No.: 616,338

[52] U.S. Cl. .................. 350/96 WG; 350/161 W
[51] Int. Cl.² .......................................... G02B 5/14
[58] Field of Search ............ 350/96 WG, 161, 160

[56] References Cited
UNITED STATES PATENTS 3,906,393  9/1975  Fletcher et al. .......... 350/96 WG X

OTHER PUBLICATIONS

C. S. Tsai, Let. Nguyen, S. K. Yao, M. A. Alhaider "High-Performance Acousto-Optic Guided-Light-Beam Device..." Applied Physics Letters, vol. 26, No. 4 2-15-75 pp. 140-142.

P. F. Heidrich, C. G. Powell and S. C. Tseng, "Transducer Array for Generation of Multiple Surface-Wave Columns" IBM Tech. Disclosure Bulletin, vol. 15, No. 1, June 1972 pp. 168-169.

*Primary Examiner*—John K. Corbin
*Assistant Examiner*—Rolf Hille
*Attorney, Agent, or Firm*—R. S. Sciascia; L. I. Shrago

[57] ABSTRACT

An acousto-optic guided-light beam deflector of improved bandwidth utilizes at least two tilted surface acoustic waves of different frequency which are launched and phased such that the Bragg diffracted light from each surface wave interferes constructively.

9 Claims, 2 Drawing Figures

ACOUSTO-OPTIC GUIDED-LIGHT BEAM DEVICE

The present invention relates generally to optical communication and data processing systems and, more particularly, to an acousto-optic, guided-light beam deflector which may be utilized for modulating, switching and scanning a laser beam in a thin film or integrated fiber optics circuit.

There are available in the prior art, acouto-optic thin film modulators of the type wherein a surface acoustic wave produces a periodic refractive index variation in a waveguide which deflects a guided optical wave. However, these devices employ only a single surface acoustic wave interdigital transducer and, as a consequence, they suffer from either a relatively low diffraction efficiency or a relatively small bandwidth. The limitation inherent with a device employing a single transducer and, therefore, a single acoustic beam is that in order to achieve a large bandwidth, assuming an acoustic bandwidth sufficiently larger than the Bragg bandwidth, the aperture of the transducer must be very small. This requirement, in turn, results in a drastic decrease in the diffraction efficiency. A further shortcoming of the single interdigital transducer arrangement is its relatively small acoustic bandwidth. In order to overcome these problems and achieve both a large diffraction efficiency and a large bandwidth, a large RF driving power is required. However, this, in turn, increases the likelihood of a failure of the interdigital transducer.

It is, accordingly, a primary object of the present invention to provide an acousto-optic, guided-light beam device which has an improved diffraction efficiency and an increased bandwidth.

Another object of the present invention is to provide an acousto-optic, guided-light beam deflector having two or more interdigital transducers which are orientated so that their acoustic beams tilt with respect to each other in a region wherein the guided optical wave travels.

Another object of the present invention is to provide an acousto-optic, guided-light beam device wherein the Bragg diffraction is produced from two or more surface acoustic waves which are generated by a corresponding number of tilted interdigital transducers which are staggered in their center operating frequencies.

Another object of the present invention is to provide an acousto-optic, thin film modulator wherein large diffraction efficiency and large bandwidth are simultaneously achieved by two or more tilted surface acoustic waves propagating on a substrate provided with an optical waveguiding layer.

Figure 2:
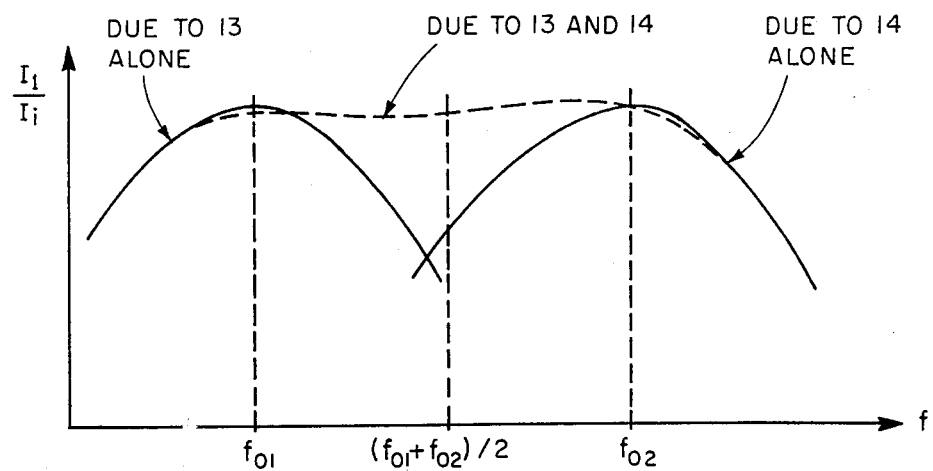

Other objects, advantages and novel features of the invention will become apparent from the following detailed description of the invention when considered in conjunction with the accompanying drawings wherein:

FIG. 1 illustrates one device configuration of the present invention wherein the Bragg diffraction results from the interaction of the light beam and two tilted surface acoustic waves; and FIG. 2 is a plot showing a bandwidth of a detector when its transducers are excited separately and simultaneously.

Referring now to FIG. 1 of the drawings, it will be seen that the acousto-optic, guided-light beam deflecting apparatus includes as one element thereof a Y-cut $LiNbO_3$ crystal plate having an optical waveguiding layer integrally formed therein by the so-called out-diffusion technique. The $LiNbO_3$ crystal substrate is utilized in this illustrative embodiment because of its large electro-mechanical coupling co-efficient, moderate acousto-optic figure of merit and the applicability of the out-diffusion process for the fabrication of the required optical waveguiding layer. The details of how such a thin positive refractive-index layer may be produced in such a composition is fully disclosed in the article "Optical waveguiding layers in $LiNbO_3$ and $LiTaO_3$" by I. P. Kaminow and J. R. Carruthers appearing in Volume 22, No. 7, pages 326 et seq. of the Applied Physics Letters (Apr. 1, 1973).

It would be pointed out that the optical waveguide can take other forms than the out-diffused Y-cut $LiNbO_3$ plate. For example, this structure may consist of an $As_2 S_3$ film on an $LiNbO_3$ substrate. If the optical waveguide involves such a combination, the film should have high acousto-optic interaction efficiency and high optical quality. Likewise, the substrate should have high efficiency in acoustic wave excitation and low acoustic loss. It should also be recognized, of course, that other suitable acousto-optic materials as well as other types of optical waveguides such as, for example, the step-index waveguide may also be used in the deflector.

The light beam which is to be deflected is coupled into the waveguiding layer by a suitable rutile prism, here positioned adjacent one edge of the crystal plate. A second prism 12 of similar construction, positioned adjacent an opposite edge of the crystal couples the diffracted light beam out from the waveguiding layer. The angular relationship between the input and output prism is exaggerated in this showing in order to clearly illustrate the separation between the deflected beam, $I_1$, and the undeflected beam, $I_0$.

Although rutile prism couplers are shown as the means for introducing the light beam into the waveguide and extracting the deflected beam, grating couplers may also be used for this purpose. Such a substitution results in a more rigid device.

A pair of interdigital surface acoustic wave transducers 13 and 14 having different center frequencies are fabricated on top of the waveguide layer. Their location and orientation are such that when they are simultaneously excited, two tilted surface acoustic waves propagate generally along the Z axis of the $LiNbO_3$ crystal, forming an interaction region which is in the path of the incident light beam, $I_i$, as it normally travels undiffracted within the waveguiding layer.

Transducers 13 and 14 are connected in parallel and their combined electrical capacitance is tuned out by a suitable inductance, not shown. Both transducers are excited by a single tunable source 15, and a variable phase shifter 16 is included in one of the transducer input circuits. This phase shifter permits the phase of the acoustic waves to be adjusted so that the Bragg deflected light from each surface acoustic wave interferes constructively. The amount of phase shift introduced is therefore determined by both the inherent phase shift of each transducer and the difference in the propagation paths of the two surface acoustic waves.

FIG. 2 illustrates the bandwidth of the acousto-optic light beam deflector when transducers 13 and 14 are excited alone. The dashed curve shows how this bandwidth increases when these transducers are excited simultaneously.

In one device constructed according to the present invention, the center frequencies of the transducers were 255 and 382 MHz, respectively. They had a tilted angle of 0.3° as measured between the axes of the two transducers. The magnitude of this angle is determined by the difference in the Bragg angles at their center frequencies.

Since the transducers should provide an acoustic bandwidth which is as wide as possible and since the fractional acoustic bandwidth of an interdigital transducer is inversely proportional to the number of interdigital single electrode pairs, two and one half finger pairs were selected for each of the above two transducers. The apertures of these transducers were 1.66 and 1.11 mm, respectively, each being large enough to insure that the individual diffraction was in the Bragg regime.

When the two transducers were excited simultaneously, the deflector had a bandwidth of ≈ 190 MHz. This bandwidth was larger than the sum of the individual bandwidths measured when a first acoustic wave was propagating alone as a result of the energization of the lower frequency transducer and when a second acoustic wave was propagating alone as a result of the energization of the higher frequency transducer. Bragg diffraction peaks were observed in the neighborhood of the transducer center frequencies, namely 255 MHz and 382 MHz, as expected. The dip between the two peaks may be eliminated either by adjusting phase shifter 16 or by selecting the center frequencies so that they are separated by a smaller amount. An additional peak, located between the two peaks mentioned above, was observed in one case where the two center freqencies were 170 MHz and 200 MHz, a 30 MHz separation. In this particular device a bandwidth of 60 MHz was obtained.

In an arrangement shown in FIG. 1, two tilted acoustic waves combined to produce the guided-light beam Bragg diffraction. However, it should be understood, of course, that more than two such surface waves can be employed for this purpose. For example, four acoustic waves may be propagated simultaneously along the boundary surface of the substrate. These waves would originate from a like number of transducers having different center frequencies. In such a modification, one phase shifter would be required for each pair of adjacent transducers and the tilted angle between each such pair would again be equal to the difference in the Bragg angles at their center frequencies.

Similar frequency responses with the resultant device bandwidth varying from 155 to 195 MHz were obtained as the incident angle of the light beam was varied by approximately ±25 from the optimum Bragg condition. Measurements of the strengths of the two surface acoustic waves using a laser beam probe at normal incidence to the substrate as a function of frequency indicated that the resultant deflector bandwidth was primarily limited by the acoustic bandwidth of the two transducers. Thus, a larger bandwidth may be realized by inserting a wide-band electric matching network between the signal generator and the two transducers 13 and 14.

What is claimed is:

1. An acousto-optic light deflector comprising, in combination
   a substrate having an optical waveguide formed along one boundary surface thereof;
   means for coupling a light beam into said substrate such that said light beam normally travels through said waveguide along a predetermined path;
   means for launching a pair of surface acoustic waves along said boundary surface in directions such that both surface acoustic waves simultaneously change the index of refraction of a portion of said path whereby said light beam is deflected therefrom; and
   means for extracting said deflected light beam from said substrate.

2. In an arrangement as defined in claim 1 wherein said surface acoustic waves have different frequencies.

3. In an arrangement as defined in claim 1 wherein said means for launching said pair of surface acoustic waves includes
   a pair of interdigital transducers located on said boundary surface and having different center frequencies; and
   means for exciting one of said transducers with an AC signal having a particular phase and the other of said transducers with the same AC signal but with the phase thereof shifted with respect to that of the AC signal exciting said one transducer.

4. In an arrangement as defined in claim 3 wherein the phase relationship between the signals exciting said transducers is such that Bragg diffracted light from each surface acoustic wave interferes constructively.

5. An acousto-optic light deflector comprising, in combination an optical waveguide having a boundary surface;
   means for introducing a light beam into said waveguide such that said light beam normally travels therein along a particular path;
   a pair of interdigital transducers formed on said boundary surface and having different center frequencies;
   said transducers being positioned such that the surface acoustic waves launched by said transducers when they are excited cause Bragg diffraction of said light beam;
   means for simultaneously exciting both transducers such that the Bragg diffracted light from each surface acoustic wave interferes constructively; and
   means for extracting said Bragg diffracted light from said waveguide.

6. An acousto-optic light deflector comprising, in combination
   an optical waveguide formed along one boundary surface of a substrate;
   means for coupling a light beam into said waveguide such that said beam travels through said waveguide along a given path;
   means for launching at least two tilted surface acoustic waves along said boundary surface in directions such that both waves change the index of refraction of a portion of said path so that Bragg diffraction of said light beam occurs and said beam is deflected from said given path; and
   means for coupling said deflected light beam from said waveguide.

7. In an arrangement as defined in claim 6 whereby said means for launching said two tilted acoustic waves includes
   a pair of interdigital transducers supported by said boundary surface and having different center frequencies; and means for exciting one of said transducers with an AC signal of a particular phase and the other of said transducers with the same AC signal but of a different phase.

8. In an arrangement as defined in claim 7 wherein the phase relationship between the AC signal exciting said one transducer and the AC signal exciting said other transducer is such that the Bragg diffracted light from each surface acoustic wave interfers constructively.

9. In an arrangement as defined in claim 6 wherein said means for launching said two tilted acoustic waves includes a pair of interdigital transducers mounted on said boundary surface and having different center frequencies, said transducers being positioned such that the acoustic surface waves produced by said transducers when they are excited intersect at an angle which is equal to the difference in the Bragg angles of the center frequencies of said transducers.

* * * * *